United States Patent
Himi et al.

(10) Patent No.: US 8,406,104 B1
(45) Date of Patent: Mar. 26, 2013

(54) OPTICAL DISK LIBRARY DEVICE AND OPTICAL DISK DEVICE SELECTING METHOD

(75) Inventors: Takuya Himi, Tokyo (JP); Shinji Fujita, Yokohama (JP); Norimoto Ichikawa, Fujisawa (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/572,739

(22) Filed: Aug. 13, 2012

(30) Foreign Application Priority Data

Sep. 14, 2011 (JP) ................................. 2011-200114

(51) Int. Cl.
*G11B 7/00* (2006.01)
(52) U.S. Cl. .................. 369/53.2; 369/53.12; 369/53.41; 369/47.1
(58) Field of Classification Search ........................ None
See application file for complete search history.

(56) References Cited

U.S. PATENT DOCUMENTS

| 5,748,589 A | * | 5/1998 | Shimizu | ....................... 369/53.2 |
| 2007/0288808 A1 | * | 12/2007 | Gulas et al. | ................... 714/718 |

FOREIGN PATENT DOCUMENTS

| JP | 10-162402 | 6/1998 |
| JP | 2006-18955 | 1/2006 |
| JP | 2007-164912 | 6/2007 |

* cited by examiner

*Primary Examiner* — Muhammad N Edun
(74) *Attorney, Agent, or Firm* — Antonelli, Terry, Stout & Kraus, LLP.

(57) ABSTRACT

In an optical disk library device using a plurality of optical disk devices, before optical disk devices execute recording or reproduction of information to or from optical disks, self-monitoring information is acquired from an optical disk monitor, use preferential orders of the optical disk devices are evaluated on the basis of use frequency information or deterioration information included in the self-monitoring information and an optical disk device to be used for recording or reproduction of information is selected on the basis of the use preferential orders.

10 Claims, 6 Drawing Sheets

| ITEMS | SPECIFICATION VALUE | SELF-MONITORING INFORMATION |
|---|---|---|
| POWER ON-TIME | A | a |
| LASER BEAM EMISSION TIME | B | b |
| START TIME OF DISK ROTATION MECHANISM | C | c |
| SEEK OPERATION FREQUENCY AND DISTANCE | D | d |
| OPTICAL DISK INSERTION/DELIVERY FREQUENCY | E | e |

FIG.7

| ITEMS | INITIAL VALUE | SELF-MONITORING INFORMATION | PRE-SELF-MONITORING INFORMATION |
|---|---|---|---|
| LASER DIFFERENTIAL COEFFICIENT | A | a | w |
| SEEK FAILURE FREQUENCY | B | b | x |
| REPRODUCTION ERROR FREQUENCY | C | c | y |
| ALTERNATE DESTINATION RECORDING FREQUENCY | D | d | z |

FIG.8

```
START OPTICAL DISK DEVICE SELECTION
            ↓
RECEIVE PIECES OF SELF-MONITORING
INFORMATION OF INDIVIDUAL OPTICAL    — S118
         DISK DEVICES
            ↓
EVALUATE PREFERENTIAL ORDERS FROM
RECORDING TIME AND REPRODUCTION      — S119
            TIME
            ↓
SELECT OPTICAL DISK DEVICE OF HIGH   — S11A
       PREFERENTIAL ORDER
            ↓
END OPTICAL DISK DEVICE SELECTION
```

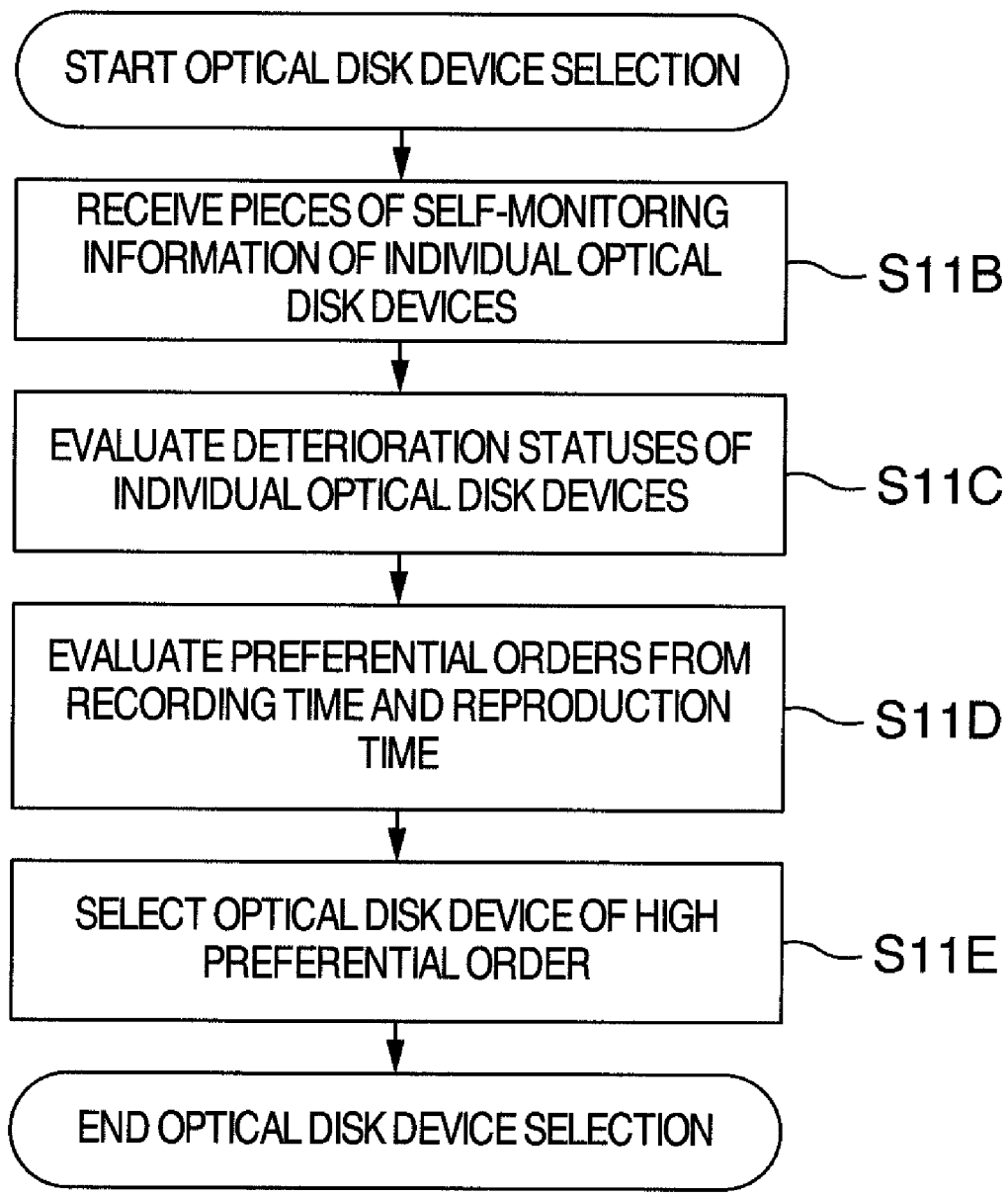

OPTICAL DISK LIBRARY DEVICE AND OPTICAL DISK DEVICE SELECTING METHOD

INCORPORATION BY REFERENCE

The present application claims priority from Japanese application JP2011-200114 filed on Sep. 14, 2011, the content of which is hereby incorporated by reference into this application.

BACKGROUND OF THE INVENTION

The present invention relates to an optical disk device and more particularly, to a method of managing the use statuses of individual optical disk devices to select an optical disk device to be used in an optical disk library device using the plurality of optical disk devices.

JP-A-10-162402 gives a description "When an interface conversion device operates to count frequencies of issuances of load commands delivered out of an upper device and to eject or receive a read/write system command, a means is provided for picking and storing operation frequencies and write/block numbers. The individual frequencies and numbers have their threshold values which are compared with stored pieces of statistical information. If the statistical information is exceeded, driving is placed in life span mode arrival condition. A means is provided for limiting the command process received from the upper device when the life span mode arrival condition is reached, thus enabling arrival at a life span area to be detected."

JP-A-2007-164912 gives a description "A use history of hard disk devices is managed and a determined number of hard disk devices to be used are selected on the basis of the use history. For the use history, management information the hard disk device manages internally (for example, SMART (Self-Monitoring Analysis and Reporting Technology) may be utilized or the information processing device may manage by itself the use frequency and use time of each of the hard disk devices. For example, by preferentially selecting a hard disk device subject to less use frequency and less use time, the use frequencies of the individual hard disk devices can be equalized."

Further, JP-A-2006-18955 gives a description "Referring to FIG. 5, a life span mode arrival setting process in an optical disk device 204 will be explained. The present process makes a decision as to whether a drive 210 arriving at the life span is permitted to be used or not. Firstly, after a life managing process (corresponding to FIGS. 3 and 4) is carried out in step 500, comparison with a preset threshold value is executed and when an excess of threshold is determined, the drive 210 is set to life span mode arrival in step 502. In this manner, driving in excess of the life span threshold is automatically set to a life span arrival mode but, alternatively, a means for causing the upper device to execute suppression of life span via a SCSI may be provided."

SUMMARY OF THE INVENTION

Since the optical disk device is constituted by a number of parts such as an optical pickup, a spindle motor and so on and, through recording or reproduction of pieces of information on or from optical disks, parts in the device are fatigued or deteriorated to become faulty or unstable in operation, it is necessary to estimate deteriorated statuses of the parts to thereby manage the life of the device.

Especially, when, in an optical disk library device using a plurality of optical disk devices, a particular optical disk device is used highly frequently and deteriorated, the reliability of the deteriorated optical disk device cannot be guaranteed and as a result, the reliability of the overall optical disk library device may possibly be impaired. Therefore, it is important to evaluate and manage the use statuses or deteriorated statuses of the individual optical disk devices for the purpose of securing and maintaining the reliability of the whole of device.

Techniques for managing the life of optical disk device are available as described in the aforementioned JP-A-10-162402 and JP 2006-18955 according to which a process is executed for inhibiting use or write operation by detecting the life of the optical disk device, but these Patent Documents fail to consider controlling selection of an optical disk device used for recording or reproduction of information before the life span reaches.

JP-A-2006-18955 is concerned with equalization of frequencies of using the hard disk devices but it confines evaluation of the loading frequencies of the hard disk device to its use history and fails to consider evaluating items and deteriorated statuses in accordance with the optical disk devices.

To solve the above problems, the present invention is materialized exemplarily as in the appended claims.

According to the present invention, by properly selecting an optical disk device to be used for recording or reproducing data, use frequencies biased to a particular optical disk device can be prevented and reliability of the whole of the optical disk library device can be assured.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram showing a table of an example of deterioration information in the second embodiment.

FIG. 8 is a diagram showing a flowchart of a process for selecting an optical disk device in a third embodiment of the optical disk library device.

FIG. 9 is a diagram showing a flowchart of a modified example of optical disk selecting process in the third embodiment.

DESCRIPTION OF THE EMBODIMENTS

The present invention will now be described by way of example with reference to the accompanying drawings.

Embodiment 1

Figure 1:
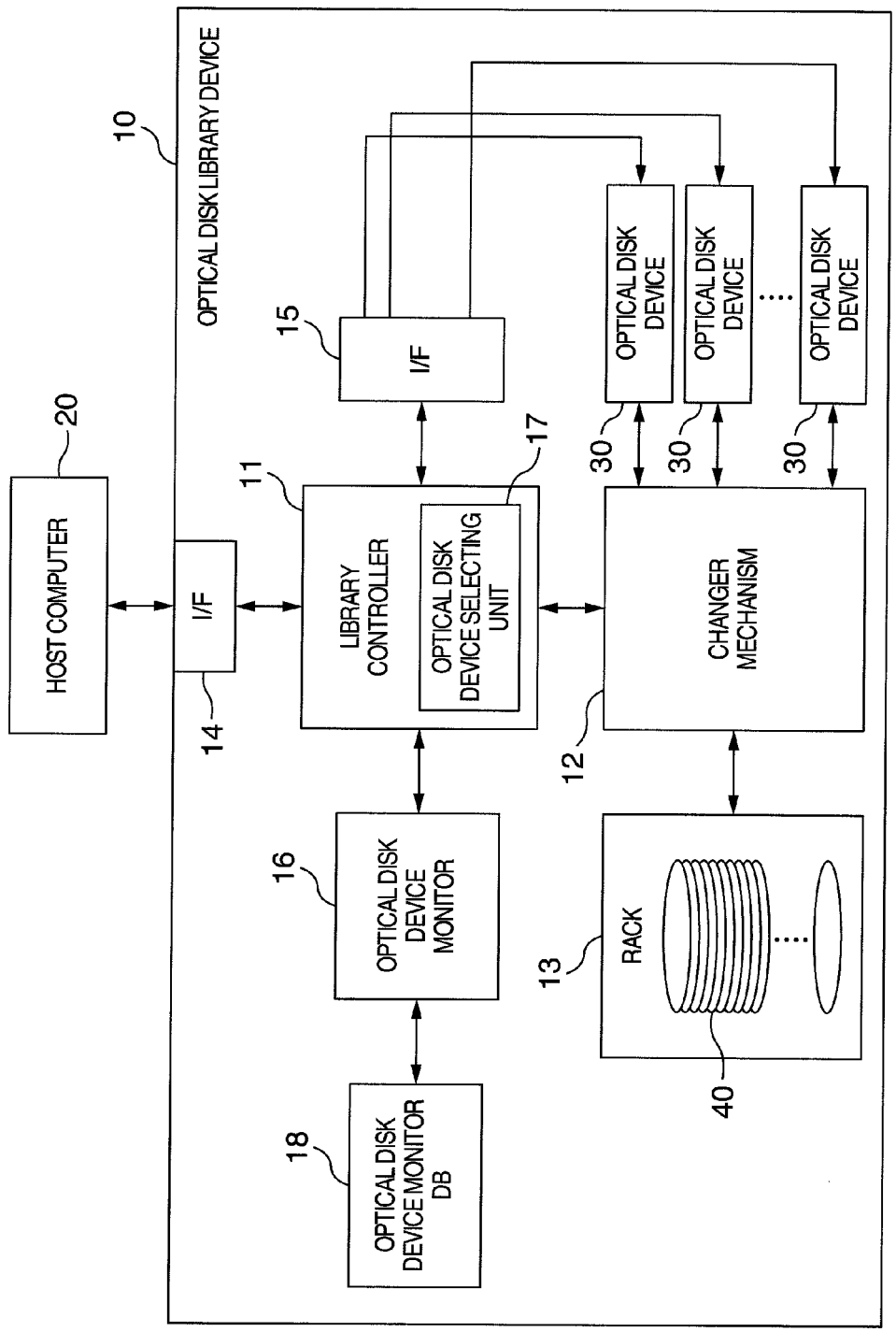
FIG. 1 is a block diagram of a first embodiment of an optical disk library device according to the present invention.

Construction and operation of an optical disk library device according to a first embodiment of the present invention will be described by making reference to the accompanying drawings. The optical disk library device in the first embodiment is illustrated in block diagram form in FIG. 1. The optical disk library device 10 according to the present embodiment comprises a library controller 11, a changer mechanism 12, a rack 13 for housing a plurality of optical disks 40, a host interface 14, a drive interface 15, an optical disk device monitor 16, an optical disk device selecting unit 17, an optical disk device monitoring database 18, and a plurality of optical disk devices 30.

The optical disk library device 10 is coupled to a host computer 20 through the host interface 14 to receive various commands for recording and reproduction and data to be recorded and then, to transmit results of execution of commands and reproduced data.

The rack 13 has a plurality of slots and the optical disks 40 can be accommodated one by one in the individual slots, respectively.

The library controller 11 has the function to control the overall operation of optical disk library device 10 and actuates the changer mechanism 12 to cause it to take a predetermined optical disk 40 out of the rack 13 and to convey and insert the optical disk to and in a predetermined optical disk device 30. Inversely, the library controller 11 commands to convey and accommodate an optical disk 40 delivered out of a predetermined optical disk device 30 to and in a predetermined slot. The library controller 11 is also connected to the individual optical disk devices 30 through the drive interface 15 so as to transmit to the predetermined optical disk device 30 various commands of recording and reproduction and data to be recorded and receive, therefrom, results of execution of commands and reproduced data and self-monitoring information as well to be described later. Further, the optical disk device selecting unit 17 in library controller 11 evaluates pieces of use frequency information or deterioration information of the individual optical disk devices 30 through the optical disk device monitor 16 and executes a process conforming to the evaluation.

The optical disk device monitor 16 has the function to evaluate the pieces of use frequency information and deterioration information of all of the optical disk devices 30 on the basis of the self-monitoring information received from the library controller 11 so as to manage them. Then, the optical disk device monitor 16 transfers the results of evaluation to the library controller 11.

The optical disk device monitoring database 18 is a database necessary for the optical disk device monitor 16 to manage statuses of the individual optical disk devices 30. Pieces of information in the database are updated and read out by means of the optical disk device monitor 16.

Figure 2:
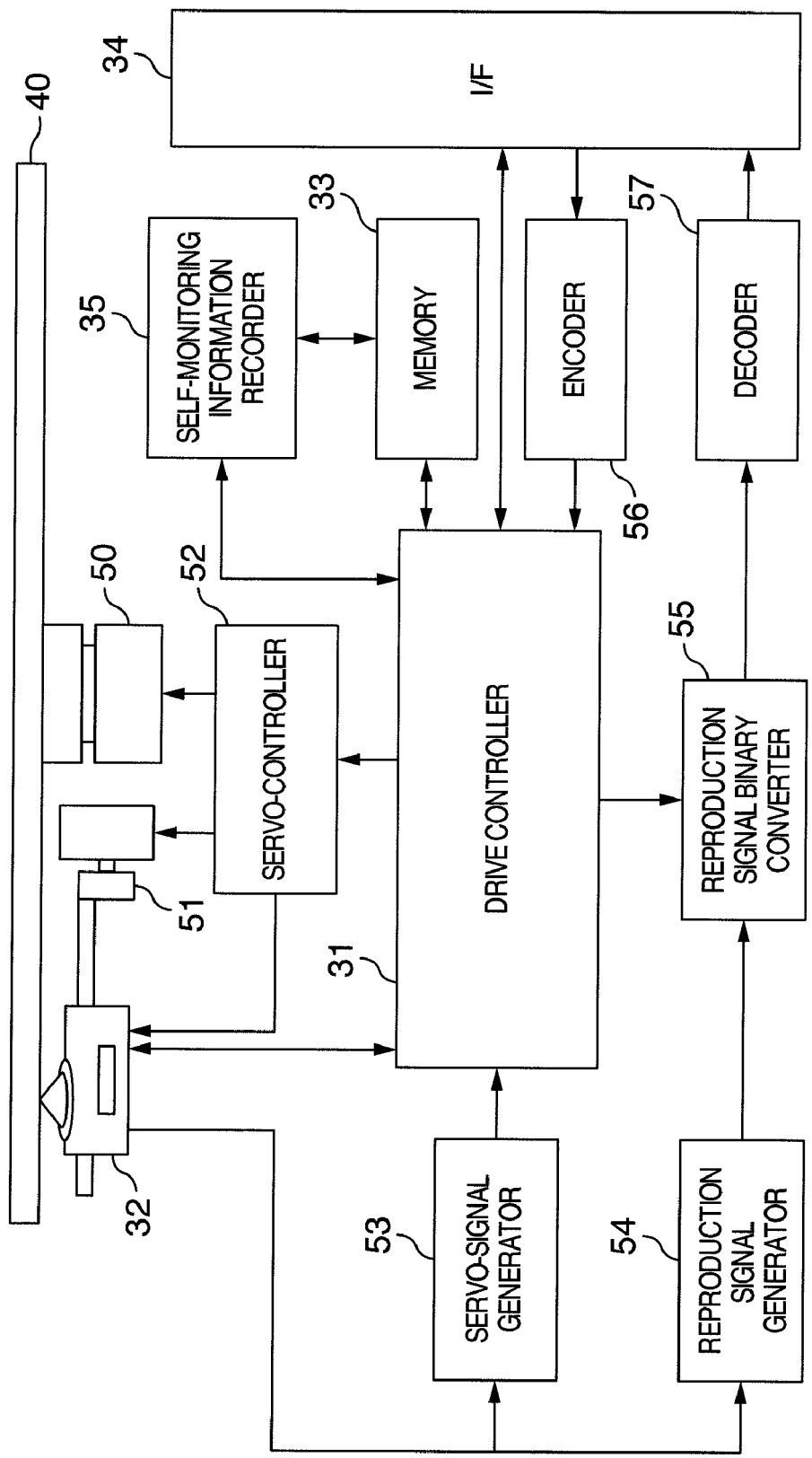
FIG. 2 is a block diagram of an optical disk device in the first embodiment.

Turning to FIG. 2, the optical disk device 30 in the first embodiment is diagrammatically illustrated in block form. The optical disk device 30 in the present embodiment comprises a drive controller 31, an optical pickup 32, a drive memory 33, a controller interface 34, a self-monitoring information recorder 35, a disk rotation mechanism 50, a slider mechanism 51, a servo-controller 52, a servo signal generator 53, a reproduction signal generator 54, a reproduction signal binary converter 55, an encoder 56 and a decoder 57.

The drive controller 31 controls the overall operation of optical disk device 30. More specifically, the drive controller 31 controls the rotation of an optical disk 40 mounted to the disk rotation mechanism 50 via the servo-controller 52, carries out seek control and feed control in which the drive controller drives the slider mechanism 51 to displace the optical pickup 32 in the radial direction of optical disk 40 and carries out focus control and tracking control by driving an objective lens of optical pickup 32.

The drive controller 31 also controls the laser beam emission of optical pickup 32. During recording, a recording data signal transmitted from the library controller 11 via the controller interface 34 is converted at the encoder 56 into a NRZI signal pursuant to a predetermined modulation rule which in turn is supplied to the drive controller 31. The drive controller 31 converts the NRZI signal to a corresponding recording strategy (light emitting pulse) so as to emit a laser beam at a predetermined light intensity and in a predetermined pulse train.

A reflection light intensity from the optical disk 40 is received and converted into an electrical signal by means of an optical detector of optical pickup 32 and the electrical signal is sent to the servo signal generator 53 and the reproduction signal generator 54. The servo signal generator 53 selectively generates various kinds of servo signals according to a detection method suitable for the mounted optical disk 40 and supplies them to the drive controller 31. The servo signal includes at least a focus error signal and tracking error signal. On the basis of the servo signal, the drive controller 31 drives the objective lens through the servo controller 52 as described previously, thus operating focus servo and tracking servo.

The reproduction signal generator 54 includes a waveform equalizing circuit and an A/D converter and applies a predetermined waveform equalization to an analog reproduction signal supplied from the optical pickup 32 and subsequently, converts the waveform equalized signal to a digital signal by sampling and quantization and supplies the digitized signal to the reproduction signal binary converter 55.

The reproduction signal binary converter 55 includes a transversal filter and a Viterbi decoding circuit. The digital signal supplied from the reproduction signal generator 54 is equalized to PR class through transversal and subjected to maximum-likelihood decoding at the Viterbi decoding circuit. The thus obtained equalized waveform is converted into a NRZI signal pursuant to the predetermined modulation rule. The NRZI signal generated by the reproduction signal binary converter 55 is corrected for data error with the help of the decoder 57 so as to be converted into a reproduction data signal which in turn is sent to the library controller 11 via controller interface 34.

The drive controller 31 records the self-monitoring information of optical disk device 30 on the drive memory 33 through the medium of the self-monitoring information recorder 35 each time that an event concerning each of the pieces of self-monitoring information takes place. The self-monitoring information includes various data concerning the use history and status and the performance of optical disk device, such as for example, power on-time of optical disk device 30, laser emission time, laser differential coefficient (gradient of I-L characteristics), start time of disk rotation mechanism, seek operation frequency and distance, insertion/delivery frequency of optical disk 40, recording time and block number, reproduction time and block number and so on.

Figure 3:
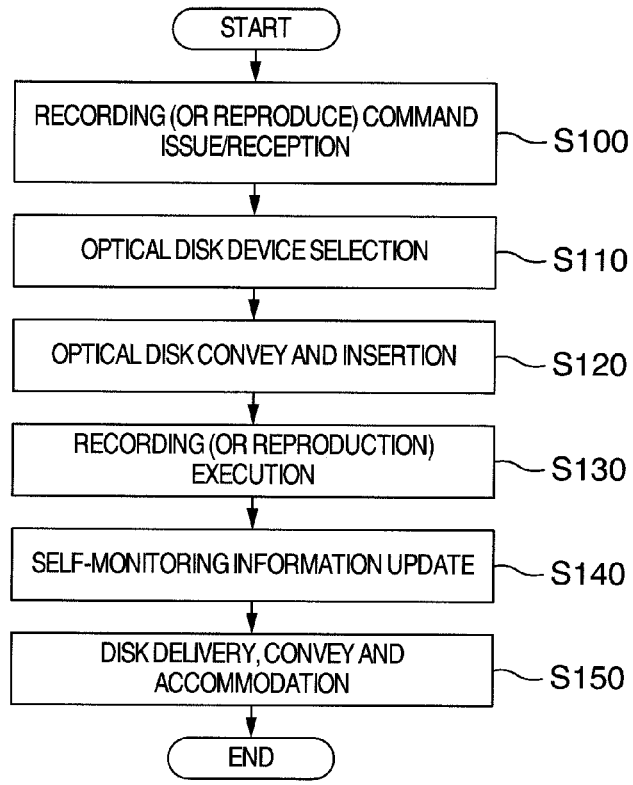
FIG. 3 is a diagram showing a flowchart of a processing operation in the optical disk library device in the first embodiment.
Figure 4:
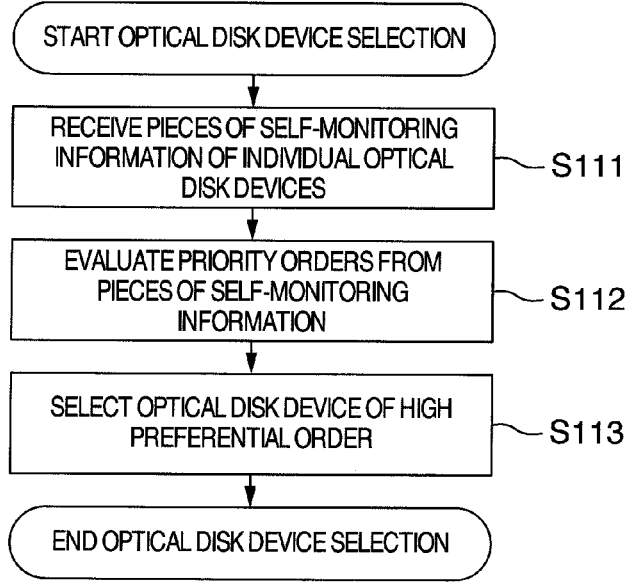
FIG. 4 is a diagram showing a flowchart of a process for selecting an optical disk device in the first embodiment.

Process operation for selecting the optical disk devices the optical disk library device in the first embodiment uses will be described in greater detail by making reference to FIGS. 3 and 4.

When receiving a command to record (or reproduce) issued from the host computer 20 in step 100, the library controller 11 causes the optical disk selecting unit 17 to select in step 110 an optical disk device 30 to be used with the aim of executing recording (or reproduction) process. An explanation will be given herein by using an example in which an optical disk device 30 is selected from a plurality of optical disk devices 30 (for the sake of convenience, 4 devices A to D).

The optical disk selecting unit 17 acquires, in step 111, pieces of self-monitoring information of individual optical disk devices which are present in the optical disk device monitoring database 18 through the medium of the optical disk monitor unit 16. For the self-monitoring information, use frequency information is utilized. As an example, the use frequency information includes power on-time, laser beam emission time, start time of disk rotation mechanism, seek operation frequency and distance, insertion/delivery frequency of optical disk 40 and so on. Since specifications are defined for parts constituting the optical disk device 30 and for its operation, these pieces of information are utilized for evaluating use preferential orders of the individual optical disk devices 30 so as to manage them in step 112.

Figures 5, 6:
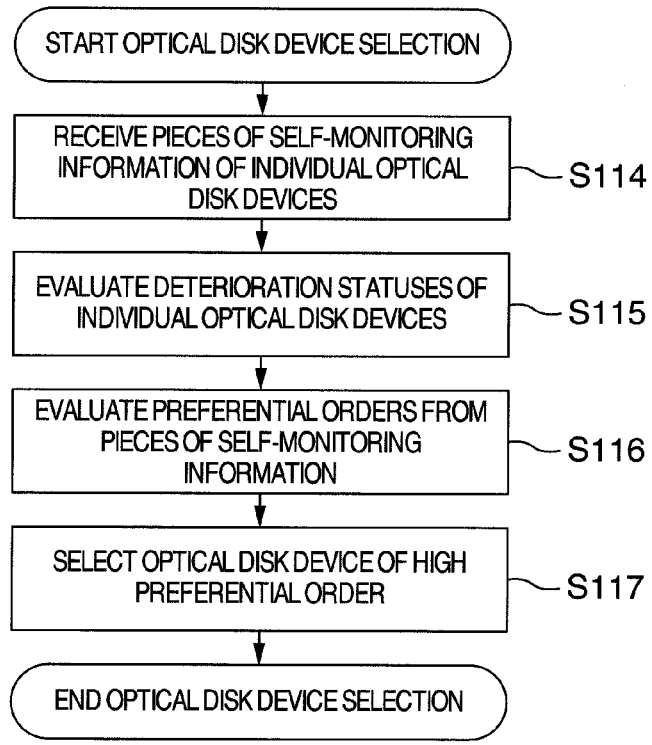
FIG. 5 is a diagram showing a table of an example of use frequency information in the first embodiment.
FIG. 6 is a diagram showing a flowchart of a process for selecting an optical disk device in a second embodiment of the optical disk library device.

An example of evaluation method will be described below by using the case of evaluating 3 items of power on-time, laser beam emission time and start time of disk rotation mechanism as shown in FIG. 5. Specification values of the individual items and self-monitoring information values are normalized for the purpose of making comparison possible by making reference to FIG. 5 and utilizing, for example, the following expression (1) for calculation. As the use time prolongs, the self-monitoring information value increases and therefore, in expression (1), a normalized value M amounts up to a large value.

$$\text{Normalized value for comparison } M = \frac{aBC + bAC + cAB}{ABC} \quad \text{(Expression 1)}$$

By comparing normalized values Ma, Mb, Mc and Md calculated from expression (1) for the individual optical disk devices 30 (devices A to D), the preferential order is evaluated. For example, when the relation among the normalized values is Ma>Mb>Mc>Md, the results of evaluation of preferential orders of optical disk devices 30 indicate the device D, device C, device B and device A in this order. Here, the following condition (inequality (2)) can also be applied. When the condition (inequality (2)) is applied, use of an optical disk device 30 exceeding the specification value can be prevented.

$$\frac{a}{A} < 1, \quad \frac{b}{B} < 1, \quad \frac{c}{C} < 1, \quad \frac{d}{D} < 1, \quad \frac{e}{E} < 1 \quad \text{(Expression 2)}$$

The example for evaluating the three items is described as above but, for example, the evaluation for one item and five items can be calculated by utilizing expressions (3) and (4), respectively.

$$\text{Normalized value for comparison } M = \frac{a}{A} \quad \text{(Expression 3)}$$

$$\text{Normalized value for comparison } M = \frac{aBCDE + bACDE + cABDE + dABCE + Eabcd}{ABCDE} \quad \text{(Expression 4)}$$

Further, in the foregoing calculation expressions, the normalization is executed by addition but as in the case of expression (5), the normalization can be executed by multiplication.

$$\text{Normalized value for comparison } M = \frac{abc}{ABC} \quad \text{(Expression 5)}$$

Next, by consulting the evaluation result obtained in step 112, an optical disk device 30 to be used is selected in step 113. For example, when the aforementioned relation among normalized values is indicated by Ma>Mb>Mc>Md, the result of evaluation of preferential orders of the optical disk devices 30 is in order of device D, device C, device B and device A. In this case, the device D becomes an optical disk device 30 having the highest preferential order and is selected as the device 30 to be used.

Here, an explanation will be given by using an example in which, of optical disk devices 30 executing a recording (or reproduction) process, the results of evaluation for preferential order of the optical disk devices 30 indicate device D, device C, device B and device A in this order. For example, when the devices D and C are being in execution of a recording (or reproduction) process, the device B is selected as an optical disk device 30 to be used.

Further, a method is possible in which, if the optical disk device 30 being in execution of a recording (or reproduction) process is present, this optical disk device 30 is excluded either in the step S111 of receiving the self-monitoring information or in the step S112 of evaluating the preferential order, but the method will not detailed herein.

When an optical disk device 30 to be used is selected, the changer mechanism 12 is actuated to take a predetermined optical disk 40 out of the rack 13 and convey and insert it to and in the selected optical disk device 30 in step 120. Then, the changer mechanism 12 executes a command to record (or reproduce) issued from the host computer 20 in step 130 and after execution, updates the self-monitoring information in step 140. In the update of self-monitoring information, the optical disk device 30 updates its self-monitoring information and transmits it to the library controller 11 which in turn transfers the received self-monitoring information to the optical disk device monitor 16 so that the optical disk monitoring database 18 may be updated. Upon the next optical disk device selection, the updated self-monitoring information can be used.

As described above, according to the first embodiment of the present invention, by evaluating the use preferential orders on the basis of the pieces of use frequency information of the individual optical disk devices in the optical disk library device, use statuses of the optical disks can be equalized.

Embodiment 2

In the first embodiment, an optical disk device 30 is selected on the basis of the use frequency information of each of the optical disk devices 30. The individual optical disk devices 30, however, have individuality differences or are deteriorated accidentally owing to their environments. In such an event, the deteriorated status cannot be grasped on the basis of only the use frequency information and therefore, an optical disk device 30 will be selected by using deterioration information in addition to the self-monitoring information. Except the above, the second embodiment is structurally identical to the first embodiment and the other constituents will not be described.

A processing operation for selecting optical disk devices to be used in the optical disk library device according to the second embodiment will be detailed using a flowchart of FIG. 6. In step 114, as self-monitoring information of each of the optical disk devices, use frequency information and deterioration information as well are captured. The deterioration information can be exemplified by a laser differential coefficient (gradient of I-L characteristics), a seek failure frequency, a reproduction error frequency, alternate destination recording frequency and so on. When individual parts constituting the optical disk device 30 show a tendency to deteriorate, a deterioration status is evaluated from these pieces of information in step 115.

An evaluation method will now be explained by taking an instance of evaluating four items of laser differential coefficient, seek failure frequency, reproduction error frequency and alternate destination recording frequency, for instance, as shown in FIG. 7. For the laser differential coefficient, by setting a threshold of a rate of change from the initial value as indicated by expression (6), the deteriorated status of laser can be perceived.

$$\text{Change rate } \alpha = \frac{|A - \alpha|}{A} \times 100 \quad \text{(Expression 6)}$$

For the seek failure frequency, reproduction error frequency and alternate destination recording frequency, by setting a threshold of a frequency of increase from an initial value, the deterioration status of the whole of optical disk device 30 can be conceived. When, of the aforementioned four items, an item in excess of the threshold is present, an optical disk device 30 is evaluated as being in deteriorated status and is so controlled as not to be selected. Then, for optical disk devices 30 which are within the threshold range of all items, evaluation is executed for preferential orders. The evaluation of preferential orders in step 116 and selection of an optical disk device 30 are similar to those in the first embodiment and will not be detailed.

As described above, according to the second embodiment of the present invention, by evaluating the pieces of deterioration information of the individual optical disk devices in the optical disk library device, an accidental deterioration can be conceived.

Embodiment 3

In the present embodiment, a description will be given of an example where the preferential order is evaluated by using use time periods as pieces of self-monitoring information of the individual optical disk devices. The device construction per se is identical to that in embodiment 1 and will not be described herein.

When the optical disk device emits a laser beam, a laser diode becomes deteriorated in accordance with its use time period. Further, since the deterioration becomes aggravated in accordance with laser power, proper evaluation cannot be achieved by grasping only the use time period of optical disk. Accordingly, in the present embodiment, by taking into account such a point that in the optical disk device, laser power for recording differs from that for reproduction, the preferential order of an optical disk to be used is evaluated. A processing operation for selecting an optical disk device to be used by means of the optical disk library device in the third embodiment will be detailed on the basis of a flowchart of FIG. 8. In step 118, as self-monitoring information of each of the optical disk devices, information concerning time period used for data recording (hereinafter, referred to as recording use time) and information concerning time period used for data reproduction (hereinafter, referred to as reproduction use time) are captured. In step 119, from the acquired pieces of information concerning the recording use times and reproduction use times of the individual optical disk devices, preferential orders are evaluated. More specifically, by noticing the fact that, for example, the laser power during data recording is larger than the laser power during data reproduction in the optical disk device, the recording use time is multiplied by a predetermined coefficient A and the reproduction use time is multiplied by a predetermined coefficient B, where the relation A>B stands, and the sum of the two is evaluated to evaluate a substantial total use time (hereinafter, referred to as substantial use time evaluation value). In other words, in consideration of such a point that during recording of high laser power, the degree of deterioration of the laser diode increases, the optical disk use time period is evaluated by making weighting to the recording use time larger than that to the reproduction use time. In this manner, as compared to mere evaluation of use time of the optical disk device, loads imposed on the laser diode can be dispersed more properly and hence, lifetimes of the individual optical disk devices can be equalized. On the basis of the use time evaluated in the step 119, an optical disk device having a low substantial use time evaluation value in consideration of the weighting to the recording use time (namely, having a low substantial use time) is selected preferentially.

It should be understood that the present invention is in no way limited to the embodiments set forth so far and various modified examples may be included in the present invention. For example, the foregoing embodiments are described in detail to make the present invention easy to understand and are not always limited to having all constituents described previously. Further, part of an embodiment can be substituted for another embodiment or the constituent of an embodiment can be added with the constituent of another embodiment.

For example, the third embodiment described as above may be added with the constituents of the second embodiment to carry out a process shown in FIG. 9. In FIG. 9, a deterioration status of the optical disk device described in connection with embodiment 2 is evaluated in step 11C. In addition, in step 11D, the preferential orders are evaluated from pieces of information concerning the recording use time and reproduction use time of the individual disk devices. When, of the items indicative of deterioration status explained in connection with embodiment 2, the presence of an item exceeding a threshold is determined in the step 11C, control is so carried out as not to select an optical disk device placed in deterioration status in step 11E and subsequently, an optical disk device having a low substantial use time evaluation value (namely, a short substantial use time) may be selected preferentially from the remaining individual optical disk devices. In this manner, part of the constituent of an embodiment can be replaced with the constituent of another embodiment or the constituent of an embodiment can be added with the constituent of another embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk library device for selecting an optical disk device to be used from a plurality of optical disk devices each capable of performing recording/reproduction to/from an optical disk, comprising:
    a library controller which controls the plurality of optical disk devices; and
    an optical disk device monitor adapted to monitor statuses of the plural optical disk devices and to save self-monitoring information inclusive of use frequency information of the optical disk device,
    wherein before optical disk devices execute recording or reproduction of information to or from optical disks, the self-monitoring information is acquired from the optical disk monitor, use preferential orders of the optical disk devices are evaluated on the basis of use frequency information or deterioration information included in the self-monitoring information and an optical disk device to be used for recording or reproduction is selected on the basis of the use preferential order.

2. An optical disk library device according to claim 1, wherein the deterioration information included in the self-monitoring information includes at least one of a laser differential coefficient, a seek failure frequency, a reproduction error frequency and an alternate destination recording frequency.

3. A method of selecting an optical disk device to be used from a plurality of optical disk devices each capable of performing recording/reproduction to/from an optical disk, comprising the steps of:
    acquiring, before optical disk devices execute recording or reproduction of information to or from optical disks, pieces of self-monitoring information of the plurality of optical disk devices;
    evaluating use preferential orders of the optical disk devices on the basis of the self-monitoring information; and
    selecting an optical disk device to be used on the basis of the use preferential orders.

4. An optical disk device selecting method according to claim 3, wherein the self-monitoring information acquired in the self-monitoring information acquiring step includes use frequency information of the optical disk device and the evaluation is carried out on the basis of the use frequency information in the use preferential order evaluating step.

5. A method of selecting an optical disk device to be used from a plurality of optical disk devices each capable of performing recording/reproduction to/from an optical disk, comprising the steps of:
    acquiring, before optical disk devices execute recording or reproduction of information to or from optical disks, pieces of self-monitoring information of the plurality of optical disk devices;
    evaluating deterioration statuses of the optical disk devices on the basis of the self-monitoring information;
    evaluating use preferential orders of the optical disk devices on the basis of the self-monitoring information; and
    selecting an optical disk device to be used on the basis of the use preferential orders.

6. An optical disk device selecting method according to claim 5, wherein the self-monitoring information acquired in the self-monitoring information acquiring step includes use frequency information and deterioration information of the optical disk device;

evaluation is carried out on the basis of the deterioration information in the use preferential order evaluating step to control an optical disk device evaluated as deteriorated such that it is not selected; and
    the use preferential order is evaluated on the basis of the use frequency information.

7. An optical disk device selecting method according to claim 5, wherein the self-monitoring information used when evaluating the deterioration status of the optical disk device includes at least one of a laser differential coefficient, a seek failure frequency and an alternate destination recording frequency.

8. An optical disk library device for selecting an optical disk device to be used from a plurality of optical disk devices each capable of performing recording/reproduction to/from an optical disk, comprising:
    a library controller which controls the plurality of optical disk devices; and
    an optical disk device monitor adapted to monitor statuses of the plural optical disk devices and to save self-monitoring information inclusive of information concerning recording use time and reproduction use time of the optical disk device,
    wherein before optical disk devices execute recording or reproduction of information to or from optical disks, the self-monitoring information is acquired from the optical disk monitor, use preferential orders of the optical disk devices are evaluated on the basis of the information included in the self-monitoring information concerning the recording use time and the reproduction use time and an optical disk device to be used for recording or reproduction of information is selected on the basis of the use preferential orders.

9. An optical disk library device according to claim 8, wherein the self-monitoring information the optical disk device monitor saves includes pieces of deterioration information of the optical disk devices and when evaluating use preferential orders of the optical disk devices, evaluation is performed on the basis of the deterioration information and an optical disk device evaluated as deteriorated is so controlled as not to be selected.

10. An optical disk library device according to claim 9, wherein the deterioration information included in the self-monitoring information includes at least one of a laser differential coefficient, a seek failure frequency, a reproduction error frequency and alternate destination recording frequency.

* * * * *